United States Patent [19]
Klassen et al.

[11] Patent Number: 6,097,838
[45] Date of Patent: Aug. 1, 2000

[54] COLOR CORRECTION OF A COMPRESSED IMAGE

[75] Inventors: R. Victor Klassen; Steven J. Harrington; Thyagarajan Balasubramanian, all of Webster; Ricardo L. de Queiroz, Fairport, all of N.Y.

[73] Assignee: Xerox Corporation, Stamford, Conn.

[21] Appl. No.: 09/306,162

[22] Filed: May 6, 1999

Related U.S. Application Data

[62] Division of application No. 08/770,765, Dec. 19, 1996.

[51] Int. Cl.[7] .............................. G06K 9/00; G06K 9/36; G06K 9/46; G06K 9/38; G03F 3/08
[52] U.S. Cl. .......................... 382/167; 382/162; 382/233; 382/250; 358/518
[58] Field of Search .................................... 382/162, 164, 382/166, 232, 233, 167, 235, 244, 245, 246, 248, 250; 358/518, 539, 426, 261.1, 261.2, 261.3, 427, 432, 433; 348/390, 391, 395, 403, 386, 717, 577

[56] References Cited

U.S. PATENT DOCUMENTS

| | | | |
|---|---|---|---|
| 4,275,413 | 6/1981 | Sakamoto | 358/525 |
| 4,558,302 | 12/1985 | Welch | 341/51 |
| 4,814,746 | 3/1989 | Miller et al. | 341/95 |
| 4,857,991 | 8/1989 | Music et al. | 348/391 |
| 5,283,671 | 2/1994 | Stewart et al. | 358/532 |
| 5,319,724 | 6/1994 | Blonstein et al. | 382/248 |
| 5,408,425 | 4/1995 | Hou | 708/402 |

OTHER PUBLICATIONS

*Encyclopedia of Graphics File Formats,* by J.D. Murray and W. VanRyper, pp. 159–171 (1994, O'Reilly & Associates, Inc.).

"Principles of Color Reproduction," J.A.C. Yule, John Wiley & Sons, Inc., New York, 1967 (pp. 267–268).

*Primary Examiner*—Leo H. Boudreau
*Assistant Examiner*—Dmitry A. Novik
*Attorney, Agent, or Firm*—Duane Basch; Mark Costello; Phillip Blair

[57] ABSTRACT

The present invention is a method for the color correction of digital images that have been compressed. In a preferred embodiment, aspects of the color correction are carried out on the compressed image data to improve computational efficiency. One of a number of alternative methods is employed to accomplish the color correction on lossy or losslessly compressed images. The color transformation process accomplishes color correction on compressed image data in conjunction with compression or decompression operations. A second, simplified phase of the color correction may be applied subsequently to the decompressed image data in certain embodiments. Accordingly, the technique has application to any number of color imaging systems, including digital printers and copiers where there is a necessity to color correct compressed digital images

13 Claims, 6 Drawing Sheets

COLOR CORRECTION OF A COMPRESSED IMAGE

This application is a divisional of application Ser. No. 08/770,765, filed Dec. 19, 1996.

This invention relates generally to the processing of compressed digital images, and more particularly to a method and apparatus for accomplishing the color correction of a compressed image so as improve the efficiency of processing of the color image.

CROSS REFERENCE

The following related applications are hereby incorporated by reference for their teachings:

"FAST PREVIEW PROCESSING FOR JPEG COMPRESSED IMAGES," Ricardo L. de Queiroz, application Ser. No. 08/537,056, filed Sep. 29, 1995; and "METHOD AND APPARATUS FOR PROCESSING OF A JPEG COMPRESSED IMAGE," Ricardo L. de Queiroz, application Ser. No. 08/721,130, filed Sep. 26, 1996.

BACKGROUND OF THE INVENTION

Data compression is required in data handling processes, where too much data is present for practical applications using the data. Commonly, compression is used in communication links, to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

Generally, an image does not change very much on a pixel to pixel basis and therefore has what is known as "natural spatial correlation". In natural scenes, correlation is generalized, but not exact. Noise makes each pixel somewhat different from its neighbors, but the natural spatial correlation enables not only the compression of digital image data, but the performance of certain image processing operations on the compressed data. Contrariwise, in synthetic graphics and computer-generated text, the correlation tends to be much higher, with colors limited to a small set. The limited set of colors and high correlation make these image types good candidates for lossless compression, at possibly higher compression ratios than those achievable with lossy compression schemes.

Heretofore, a number of patents and publications have disclosed image compression and color correction, the relevant portions of some may be briefly summarized as follows:

U.S. Pat. No. 5,408,425 to H. S. Hou, issued Apr. 18, 1995, hereby incorporated by reference for its teachings, discloses a processor and method of computation for performing a discrete cosine transform.

U.S. Pat. No. 5,319,724 to S. M. Blonstein et al., issued Jun. 7, 1994, teaches an apparatus and corresponding method for compressing still images while remaining compatible with a JPEG transformation.

U.S. Pat. No. 4,275,413 to Sakamoto et al. discloses a color space transformation where information is placed into lookup tables and stored in a memory—where the lookup table relates input color space to output color space. Sakamoto teaches a "unit cube interpolation unit" having known vertices. The lookup table is commonly a three dimensional table since color is typically defined with three variables.

U.S. Pat. No. 5,581,376 to Harrington teaches the conversion of input device signals Rs, Gs, Bs, generated by an image input terminal, to colorimetric values Rc, Gc, Bc, the colorimetric values being processed to generate address entries into a lookup table to convert them to Cx,Mx,Yx,Kx colorant signals or any multi-dimensional output color space, which includes but is not limited to CMYK or spectral data. Values not directly mapped may be determined using tetrahedral interpolation over a hexagonal lattice where the lattice is formed by offsetting every other row in at least one dimension.

SUMMARY OF THE INVENTION

In accordance with the present invention, there is provided a method for performing color correction of a compressed digital image, comprising the steps of: retrieving from memory a compressed unit of image data; partially decompressing the compressed unit to produce a partially decompressed unit representing part of the information describing a region of the image in a first color space; performing color correction on the partially decompressed unit to produce a corrected unit in the first color space; subsequently decompressing the entire corrected unit to produce decompressed, corrected image data; and converting the decompressed, corrected image data into a second color space image for rendering.

One aspect of the invention deals with a basic problem in digital image processing systems—the memory and computationally intensive operations of image processing, particularly color correction. This aspect is further based on the discovery of a technique that alleviates this problem. The technique accomplishes the color conversion of an image segment or block while it is in a digitally compressed form—produced by lossy or lossless compression operations.

This technique can be implemented, for example, by the modification of basic JPEG or LZW compression engines, where correction operations are performed on the compressed image data (compressed units). Accordingly, the technique has application to any number of systems, including digital printers and copiers where there is a requirement to provide color correction of the digital image. A machine implementing the invention can include a data or image processing system having the capability of image compression. The techniques and system described herein are advantageous because they are efficient and result in the ability to accomplish basic image processing with little additional hardware or processing as compared to other memory intensive approaches.

The present invention will be described in connection with a particular lossy (i.e., JPEG) compression embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." The term "data" includes data existing in any physical form, and includes data that are transitory or are being stored or transmitted. For example, data could exist as electromagnetic or other transmitted signals or as signals stored in electronic, magnetic, or other form. An "image" is a pattern of physical light. An image may include characters, words, and text as well as other features such as graphics. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image. An item of data "defines" an image set when the item of data includes sufficient information to produce all the images in the set.

A "pixel" is the smallest segment or region into which an image is divided in a given system. As used herein, each pixel value is a set of color space coordinates in a "color coordinate form" of an image, the color coordinate form being a two-dimensional array defining the image.

A "memory" or "storage medium" is a physical medium that can store data. Examples of data storage media include magnetic media such as hard and floppy disks, and magnetic tape; optical media such as laser disks and CD-ROMs; and semiconductor media such as semiconductor ROMs and RAMs.

A "data unit" or "unit of data" is an item of data that a processor can access or otherwise operate on as a unit. For example, an eight-bit byte is a data unit in many data processing systems. A "block" of items of data is a number of items of data that form a sequence. For example, a block or segment of an image would include data or signals representative of image pixels within a defined region of the image. As used herein a region may be a single pixel in size or may consist of a plurality of pixels.

An operation "encodes" or "compresses" items of data, when performing the operation on the items of data produces different items of data from which the encoded or compressed data items can subsequently be recovered. The operation that recovers the encoded or compressed data items is "decoding" or "decompressing." When the operation is "lossy", the decoding or decompressing operation only recovers data that is approximately the same as the original data.

An "image input terminal" (IIT) is a device that can generate or receive an image and provide an item of data defining a version of the image. A "scanner" is an image input device that receives an image by a scanning operation, such as by scanning a document. Other image input terminals include facsimile machines and computer graphic workstations.

An "image output terminal" (IOT) is a device that can receive an item of data defining an image and provide the image as output. A "display" is an image output device that provides the output image in human viewable form and a "printer" is an image output device that renders the image on a substrate in human viewable form. The visible pattern presented by a display is a "displayed image" or simply "image."

Color correction in digital images is an image processing operation comprising two steps: a correction from 3-D device independent color space (e.g., $YC_rC_b$, RGB, XYZ, or $L*a*b*$) to a 3-D device dependent color space; and then a conversion to CMYK comprising under-color removal (UCR), gray-component replacement (GCR) and linearization processes. It will be appreciated, however, that for some devices, not all of the processes in the second step are required. For example, three color devices do not need the UCR/GCR stage. Typically, the two color correction steps are accomplished in a single operation using a three-dimensional look-up table carrying out three-dimensional interpolation such as that described in U.S. Pat. No. 5,581,376 to Harrington. However, the color correction process may also be represented as the combination of two phases: a 3—3 color space correction (e.g., RGB-R'G'B') followed by a device-dependent color space transformation operation (e.g., R'G'B'-CMYK for four color devices). The ability to separate the color correction process into these two steps forms the basis for the present invention, where the more difficult of the two steps, namely the first color correction, can be accomplished on the compressed digital data so as to significantly expedite the overall correction process. The advantage being that the 3—3 color correction operation may be performed on only part of the information using a compressed data format. For instance, the correction process is preferably accomplished by a digital printer that receives the print data in a compressed format.

Figure 1:
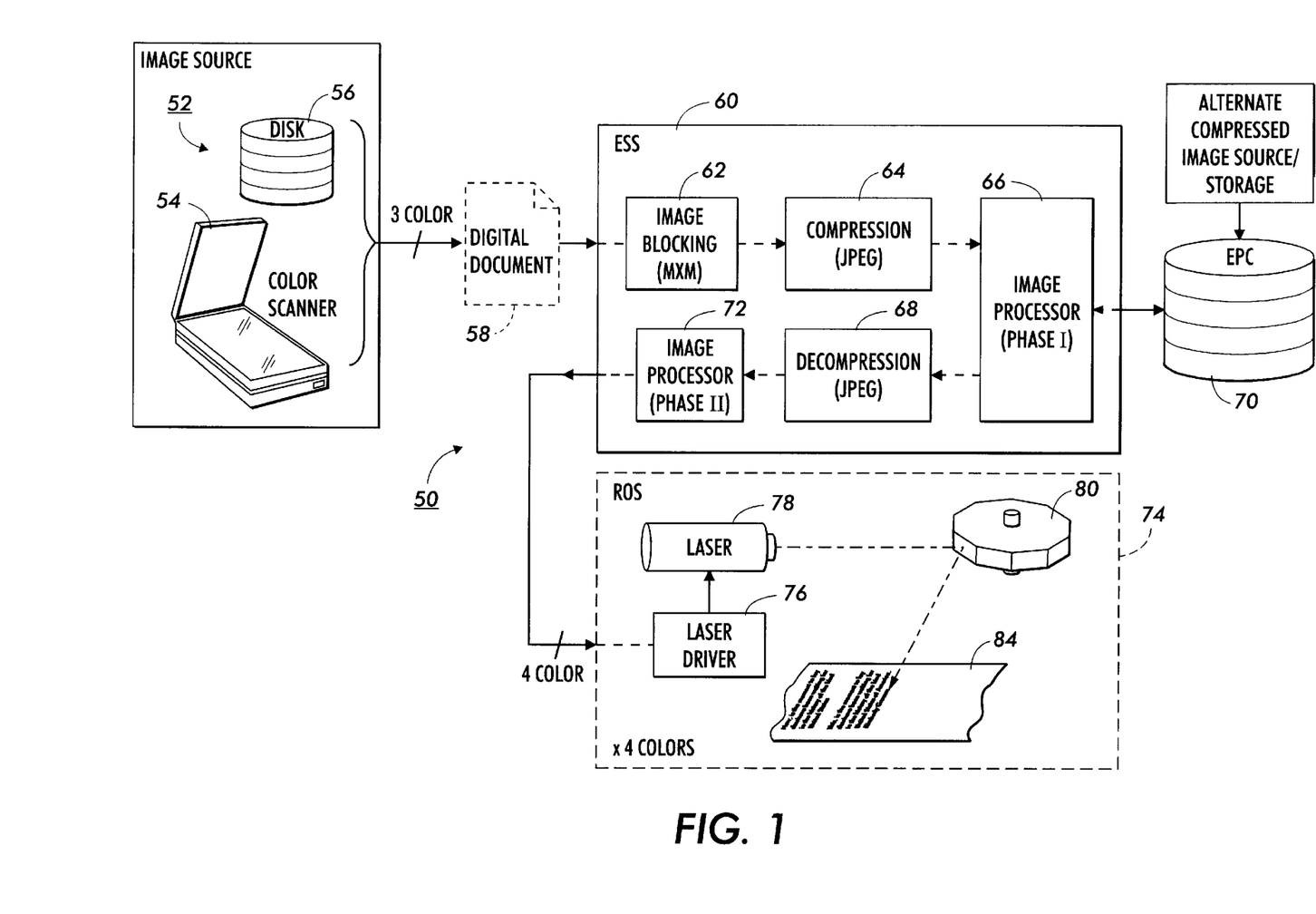
FIG. 1 is a generalized block diagram of an exemplary printing system providing an embodiment for the present invention.

Turning now to FIG. 1, displayed therein is a block diagram of a digital printing system 50 in which the present invention finds particular use. System 50 includes an image input terminal (IIT) 52 that may include any number of image sources such as a color scanner 54 or storage medium (disk) 56 suitable for generating or otherwise providing a digital document 58. A digital document containing an image is the output of the IIT, and is provided to image handler 60 that forms a part of the printing system. Image handler 60, while preferably providing additional functionality, includes an electronic subsystem (ESS) for carrying out the image processing and compression operations in accordance with the present invention.

In a JPEG compression embodiment, image handler 60 includes an image blocking circuit 62 capable of dividing the digital data representing the image into a plurality of M×M blocks or segments. In one embodiment, the blocking operation may be accomplished by a windowing or cropping circuit that enables the transfer of data comprising one or more M×M blocks of data from the input document to an M×M data buffer 68. The image blocking operation preferably operates to identify segments of 8 pixels by 8 scanlines for each of the three color separations. Once stored in a data buffer that is part of the image processing circuit, the data is next operated on by the JPEG compression circuitry depicted as block 64. In block 64, the data may be operated on using various compression operations associated with the JPEG compression standard to accomplish the compression of the image data within a block. As will be described with respect to the following figures, certain aspects of the JPEG compression operation are preferably performed in conjunction with the image compression operations represented by JPEG compression block 64.

Once compressed, the M×M block of data is then preferably processed by image processor 66, where the first phase color correction of a block is accomplished. Image processor 66 may be a software driven process operating on a CPU within the image processing system, or it may be a specialized piece of hardware. The output of the image processor 66 is a coded or compressed unit of data that is either subsequently stored in electronic precollation (EPC) memory 70, depicted in the figure as a disk, or further decompressed at JPEG decompression block 68 before undergoing the second phase color correction at image processing block 72.

A concise discussion of the JPEG compression standard may be found in the *Encyclopedia of Graphics File Formats*, by J. D. Murray and W. vanRyper, pp. 159–171 (1994, O'Reilly & Associates, Inc.). Further description of the JPEG standard may be found, for example, in *JPEG Still Image Data Compression Standard*, by W. Pennebaker and J. Mitchell, 1993 (Van Nostrand Reinhold, New York) or *Discrete Cosine Transform: Algorithms, Advantages and Applications*, by K. Rao and P. Yip, 1990 (Academic Press, San Diego).

As depicted in FIG. 1, IOT 74 is preferably a raster output scanning (ROS) print engine including a laser driving circuit 76 that controls or modulates laser 78 in accordance with decompressed, color corrected digital data produced by image processor 72, which may also operate in conjunction with various aspects of image processor 66. One or more lasers in the ROS-based IOT 74 is used to illuminate or expose a photoresponsive member 84 by reflecting the laser generated light beam off of the plurality of surfaces found on rotating polygon 80 so as to create, by scanning, a latent image on member 84.

Once the latent image is produced, it would be developed in accordance with any of a number of methods known to those skilled in the art to produce a visible image. It will be further appreciated that the digital image data may be employed to drive or otherwise control any number of image output terminals, particularly color output devices where the data representing an image typically includes at least four color separations (e.g., cyan, magenta, yellow and black) each processed and stored as a separate image plane or in luminance-chrominance form to further reduce storage requirements.

Figure 2:
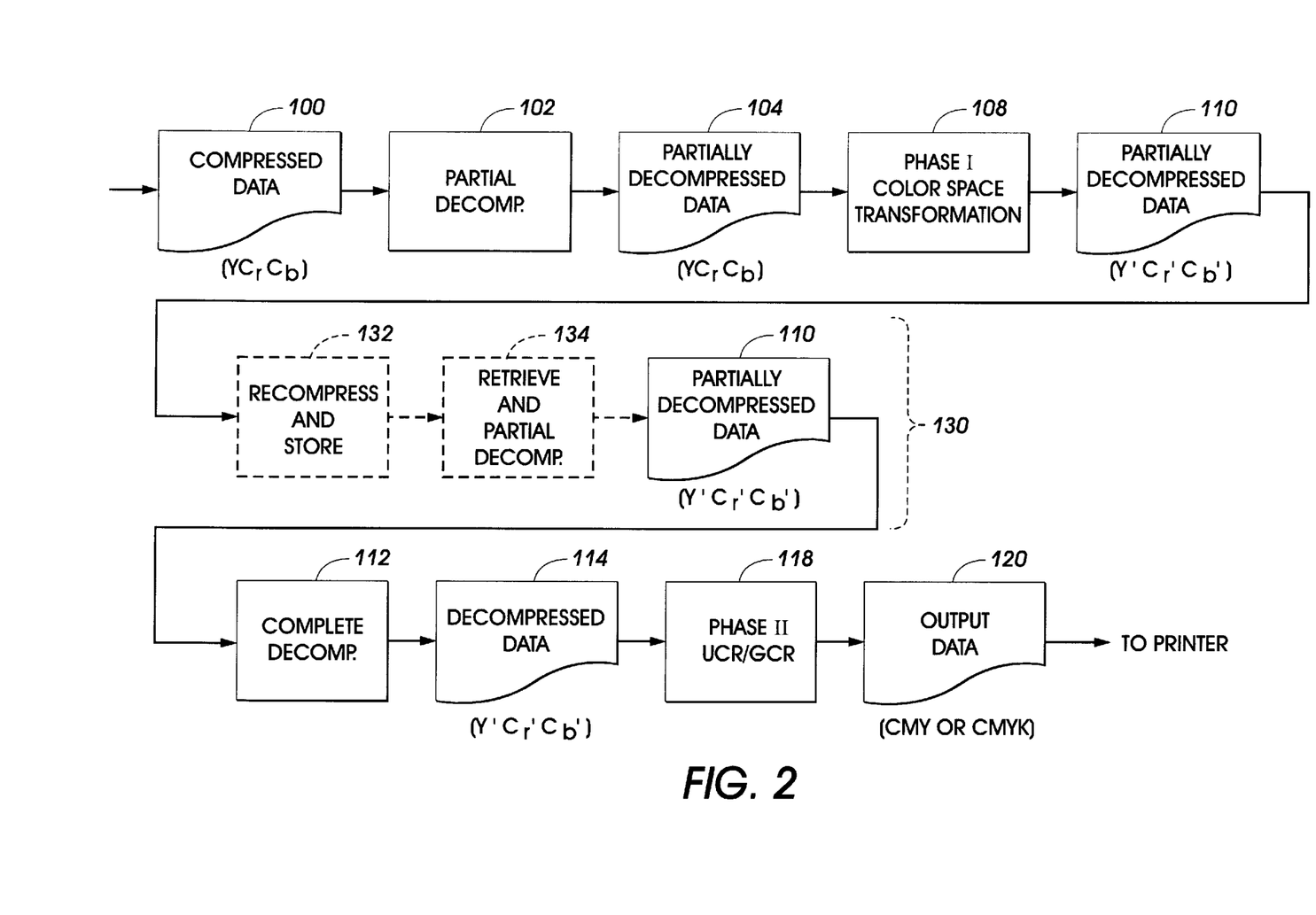
FIG. 2 is a flow diagram illustrating the operations and resultant data for a generalized embodiment of the present invention.

Having described the general operation of a printing system employing the present invention, attention is now turned to specific details of the operation of the compression and decompression blocks (64 and 72) working in conjunction with image processors 66 and 72. With reference to FIG. 2 there is depicted a flow diagram illustrating the various processing steps in which processing of the image data is accomplished. Initially, compressed image data in the form of a digital document 100 comprising a plurality of coded or compressed units (representing the compressed color image in a three-dimensional color space such as $YC_rC_b$), is provided to partial decompression block 102. Partial decompression block 102 is intended to partially decompress the coded units. For example, in the preferred JPEG image compression embodiment depicted in FIG. 3, the coded units are decompressed into a series of discrete cosine transform (DCT) coefficients using: (a) a variable length (Huffman) decoding operation 200; (b) an N×N sub-block extraction operation 202; followed by (c) an inverse DCT operation 204, performed only on the N×N sub-block of coefficients. The result of the partial decompression step is a partially decompressed image 104, including the DC coefficient and possibly AC coefficients as well, as will be described below.

It will be appreciated that the DCT coefficients within the partially decompressed image data 104 may be processed using color correction or adjustment operations, particularly applied to the DC and low order AC terms. These terms may be processed using matrix-based or tetrahedral interpolation operations on the N×N coefficient set to accomplish the color correction for the DC and low order AC terms, with the understanding that the higher order AC coefficients will have little impact on the perceived color of the block.

Figure 3:
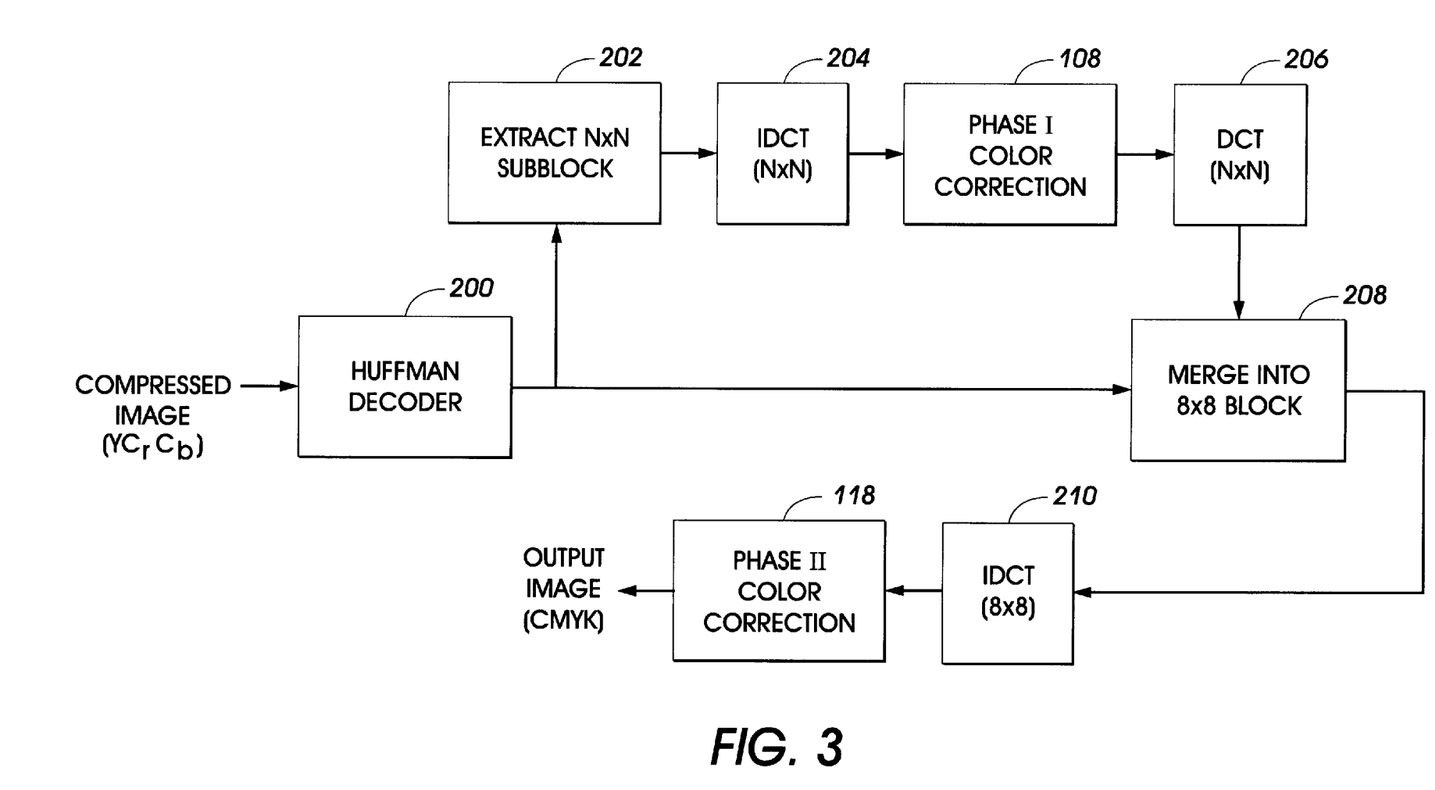
FIG. 3 is a flow chart depicting the various processing steps in a JPEG image system operated in accordance with an embodiment of the present invention.

Referring to FIGS. 2 and 3, the partially decompressed data is provided to the first phase color correction block 108 where tetrahedral interpolation processing is performed to complete the color correction transformation. Recognizing that the most visually significant information is represented in the first few coefficients for each DCT block (the DC component indicating the average color), this data serves as the basis for the first color correction transformation. The color correction operation may be generally characterized as a function that maps a set of device independent or visually based color coordinates, for example, $YC_rC_b$ to a corresponding set of device coordinates $Y'C_r'C_b'$. Due to the complex nature of this function, it is usually implemented as a three dimensional (3-D) lookup table with 3-D interpolation. It is important to note that the color correction function does not change the orientation of the color space (in this example, a luminance dimension Y, and two chrominance dimensions $C_r$, $C_b$). Rather, it alters the coordinate locations in the color space to reflect the characteristics of a particular device. The color correction function is applied to an image corresponding to the sub-matrix of DCT coefficients.

Further reference with respect to color correction transformation can be found, for example, in "Principles of Color Reproduction," J. A. C. Yule, John Wiley & Sons, Inc, New York, 1967 (see p. 267–268). In a preferred embodiment, the proposed color correction method uses a fraction of the coefficients in a compressed block (i.e. N×N coefficients out of the original M×M coefficients) to directly generate the color corrected image.

As described by de Queiroz in U.S. patent application Ser. No. 08/537,056, previously incorporated by reference, computational efficiency is improved by matrix processing of only a portion of the DCT coefficients. It will be appreciated that the techniques described by de Queiroz et al. may be similarly applied to processing DCT coefficients to accomplish color correction.

More specifically, let the description for the DCT coefficients of a transformed block of 8×8 pixels of a single color separation in the transform coder (JPEG) be:

$$\begin{bmatrix} y_{00} & y_{01} & \cdots & y_{07} \\ y_{10} & y_{11} & \cdots & y_{17} \\ \vdots & \vdots & \ddots & \vdots \\ y_{70} & y_{71} & \cdots & y_{77} \end{bmatrix}$$

The description of the N×N lowest frequency coefficients is:

$$\begin{bmatrix} y_{00} & y_{01} & \cdots & y_{0,N-1} \\ y_{10} & y_{11} & \cdots & y_{1,N-1} \\ \vdots & \vdots & \ddots & \vdots \\ y_{N-1,0} & y_{N-1,1} & \cdots & y_{N-1,N-1} \end{bmatrix}.$$

The color correction process is preferably applied only to a subset of N×N coefficients. These coefficients are obtained by inverse transforming the N×N lowest frequency DCT coefficients using an N×N inverse DCT. If the DCT of size N×N is given by the N×N matrix $C_N$ whose entries are:

$$c_{ij} = \alpha_i \sqrt{\frac{2}{N}} \cos\left(\frac{(2j+1)i\pi}{2N}\right); i = 0, \ldots, N; j = 0, \ldots, N$$

where, $\alpha_0 = 1/\sqrt{2}$, $\alpha_{i>0} = 1$, the N×N pixels used for color correction are obtained by performing the following matrix multiplication, wherein fast equivalent implementation methods may be applied.

$$\begin{bmatrix} z_{00} & z_{01} & \cdots & z_{0,N-1} \\ z_{10} & z_{11} & \cdots & z_{1,N-1} \\ \vdots & \vdots & \ddots & \vdots \\ z_{N-1,0} & z_{N-1,1} & \cdots & z_{N-1,N-1} \end{bmatrix} =$$

$$\frac{N}{8} \cdot C_N^T \begin{bmatrix} y_{00} & y_{01} & \cdots & y_{0,N-1} \\ y_{10} & y_{11} & \cdots & y_{1,N-1} \\ \vdots & \vdots & \ddots & \vdots \\ y_{N-1,0} & y_{N-1,1} & \cdots & y_{N-1,N-1} \end{bmatrix} C_N$$

The N×N samples $z_{ij}$ are used as input for the color correction process. The block with N×N color corrected samples is denoted by the samples $x_{ij}$. The image can be either decompressed or recompressed. In the latter case, the DCT coefficients are restored to their original form by applying a forward DCT of size N×N. Hence, $$\begin{bmatrix} y_{00} & y_{01} & \cdots & y_{0,N-1} \\ y_{10} & y_{11} & \cdots & y_{1,N-1} \\ \vdots & \vdots & \ddots & \vdots \\ y_{N-1,0} & y_{N-1,1} & \cdots & y_{N-1,N-1} \end{bmatrix} =$$

$$\frac{8}{N} \cdot C_N \begin{bmatrix} x_{00} & x_{01} & \cdots & x_{0,N-1} \\ x_{10} & x_{11} & \cdots & x_{1,N-1} \\ \vdots & \vdots & \ddots & \vdots \\ x_{N-1,0} & x_{N-1,1} & \cdots & x_{N-1,N-1} \end{bmatrix} C_N^T.$$

The new coefficients $y_{ij}$ are used to replace the old ones in the original block, prior to the full 8×8 inverse DCT.

For example, if N=2, the DCT is defined as:

$$C_2 = \frac{1}{\sqrt{2}} \begin{bmatrix} 1 & 1 \\ 1 & -1 \end{bmatrix}$$

so that the samples for color correction are obtained as $$\begin{bmatrix} z_{00} & z_{01} \\ z_{10} & z_{11} \end{bmatrix} = \frac{1}{8} \cdot \begin{bmatrix} 1 & 1 \\ 1 & -1 \end{bmatrix} \begin{bmatrix} y_{00} & y_{01} \\ y_{10} & y_{11} \end{bmatrix} \begin{bmatrix} 1 & 1 \\ 1 & -1 \end{bmatrix}$$

which are color corrected obtaining xij. Accordingly, the samples to be applied as a replacement in the original block are found as $$\begin{bmatrix} y_{00} & y_{01} \\ y_{10} & y_{11} \end{bmatrix} = 4 \cdot \begin{bmatrix} 1 & 1 \\ 1 & -1 \end{bmatrix} \begin{bmatrix} x_{00} & x_{01} \\ x_{10} & x_{11} \end{bmatrix} \begin{bmatrix} 1 & 1 \\ 1 & -1 \end{bmatrix}$$

Once the first phase color correction transformation has been accomplished at step 108, the data is again partially decompressed, but now is in the form of a device-dependent color space 110. In the JPEG compression embodiment, depicted in FIG. 3, the partially decompressed, device-dependent data is then integrated or merged (block 208) with the remaining, unprocessed DCT coefficient data before being completely decompressed as represented by complete decompression block 112 in FIG. 2 and inverse DCT compression block 210 in FIG. 3. Once fully decompressed data 114 is obtained as the result of the complete decompression operation 112, the decompressed data is passed to the second phase color correction, block 118. This phase performs a simple color space conversion to the printer signals, C, M, Y, K. For example, if the first phase color correction is a mapping from device independent $YC_rC_b$ to device dependent $Y'C_r'C_b'$, then the second phase maps device dependent $Y'C_r'C_b'$ to the printer signals CMYK. This would be accomplished in several steps, all of which would be substantially simpler than the first phase color correction. First, a 3×3 matrix may be used to map $Y'C_r'C_b'$ to CMY as follows:

$$\begin{bmatrix} C \\ M \\ Y \end{bmatrix} = [Corr. Coeff.] \begin{bmatrix} Y' \\ C_r' \\ C_b' \end{bmatrix}$$

where Corr. Coeff represents the coefficients of the 3×3 matrix.

In block 118, the device-dependent data is further processed in accordance with well-known techniques to produce data representing a plurality of color separations, preferably at least three, for rendering by a color image output device such as a printer. Processing the data includes the processes of under color removal (UCR), where a CMY component of the image is subtracted, along with gray component replacement (GCR) where the subtracted CMY is replaced, in part, by a K component. Moreover, the second phase processing may include linearizing the color separations or similar processing to adjust the tonal reproduction of the output image produced in response to output data 120 (e.g., CMYK).

In summary, the process of FIG. 2 first accomplishes a YCrCb to Y'Cr'Cb' transformation in the DCT domain. The result of this transformation leaves the low order DCT terms in a color space that is compatible with the high order terms (which have not had any processing done to them). Then in a subsequent transformation of the fully decompressed data a simpler form of correction is employed to convert from Y'Cr'Cb to CMY or CMYK, which is good enough since the low order terms have already been converted to a form for which the simpler conversion is sufficient.

Also depicted in FIG. 2 is an optional series of operations 130 that would be carried out in accordance with yet another alternative embodiment. In optional section 130, the partially decompressed data 110 may be recompressed and stored, block 132, and subsequently retrieved and partially decompressed, block 134. The intent of the alternative embodiment is to generally represent those operations that might be employed if the image being processed were not going to be immediately rendered by an output device. For instance, in the JPEG image compression embodiment, the recompression and store operation would take the partially decompressed device-dependent data, merge it with the remaining DCT coefficient data, recompress the merged DCT data (e.g., Huffman encoding) and store the data as a compressed JPEG image. Subsequently, when the image is to be rendered, it is retrieved and decompressed completely, resulting in decompressed data 114 which may be further processed as previously described with respect to the second phase color space transformation. In yet another alternative embodiment, the operations depicted in FIG. 2 may be accomplished during the compression of a color image so as to produce a compressed image for storage as described with respect to the optional operations 130.

FIG. 2 depicts a generalized color correction system operating on compressed digital images, and is not specifically limited to color correcting JPEG compressed images as represented by FIG. 3. Those skilled in the art will appreciate that the operations depicted in and described with respect to FIG. 2 have application in alternative lossy compression schemes as well as lossless compression schemes. For example, an alternative embodiment may apply aspects of the present invention to LZW-compressed images as will be described in more detail with respect to FIG. 6. Those skilled in the art will further appreciate that aspects of the present invention may be applied to compressed images (a) during decompression, (b) during compression, or (c) as a separate process carried out on previously compressed images which are subsequently recompressed.

Figure 4:
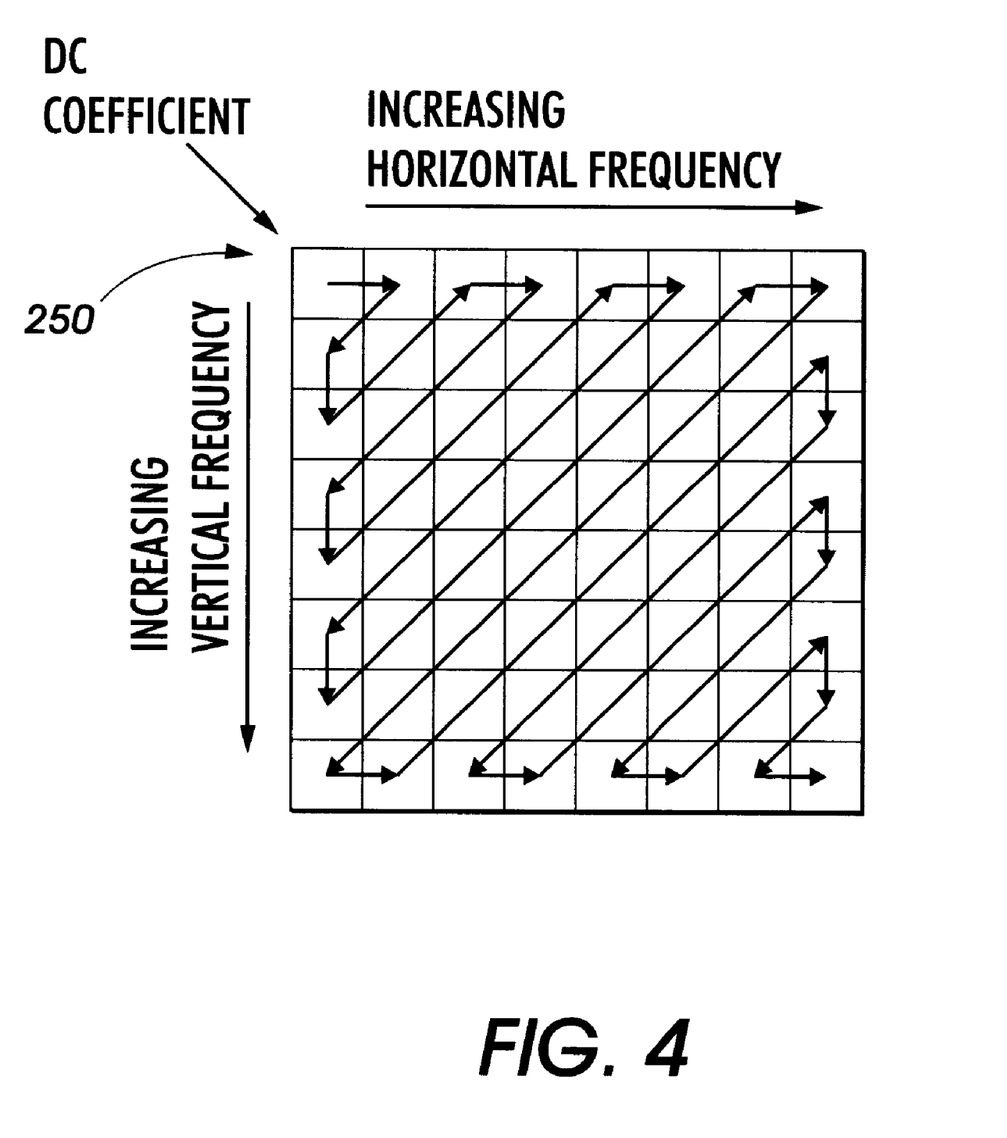
FIG. 4 is an illustration of the zigzag scanning path employed to vectorize the coefficients in a DCT coefficient matrix.
Figure 5:
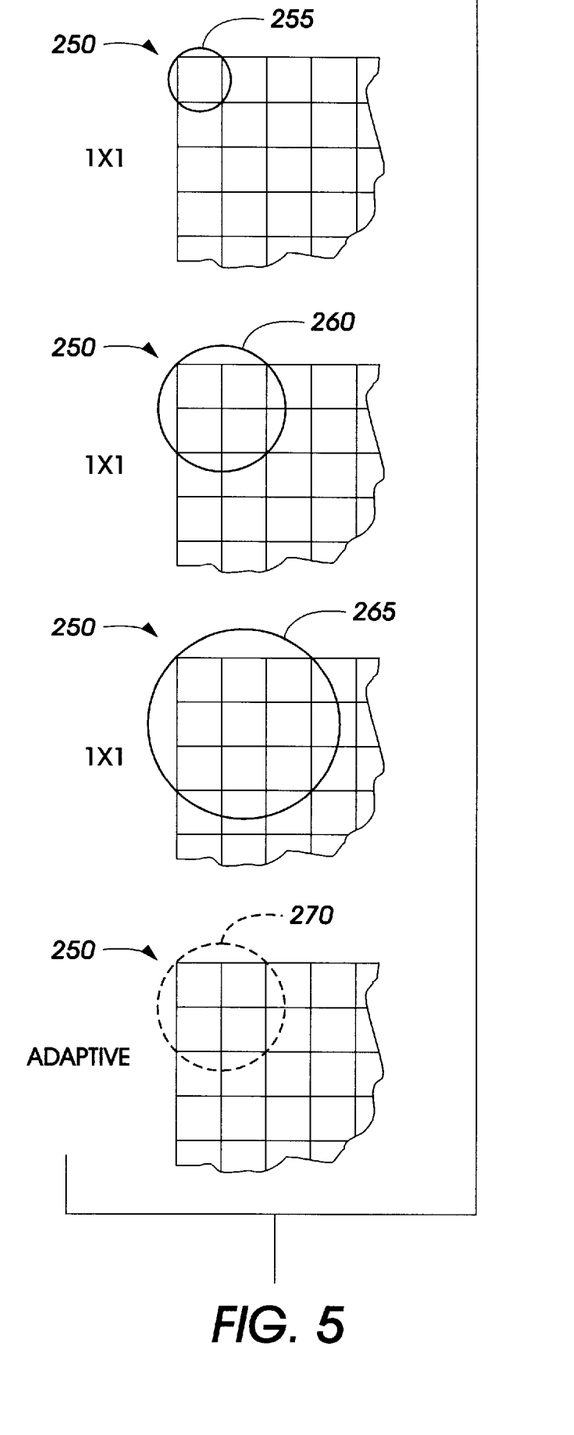
FIG. 5 is an illustration of the regions of the DCT coefficient matrix employed for various embodiments of the JPEG image compression process depicted in FIG. 3.

Color correcting a compressed color image having been generally described, attention is now turned to FIGS. 4 and 5 where further details of the JPEG compressed image embodiment are illustrated. In particular, FIG. 4 depicts the order in which quantized coefficients are re-scanned in accordance with the zigzag (diagonal) path employed in JPEG compressed images. As is well-known to those skilled in the art, the DC coefficient is represented in the upper-left corner 250 of the 8×8 coefficient matrix, and is surrounded by the lower order AC terms. In one of the JPEG image embodiments of the present invention, denoted as 1×1, only the DC coefficient 255 is employed in the color space transformation operation (Phase I), as shown in FIG. 5. For example, color facsimile compression/processing might only require that the transformation be done on the DC term. Other embodiments, denoted 2×2 and 3×3 are also depicted in FIG. 5, with the coefficient sets 260 and 265, respectively, included in the color space transformation operations previously described.

Empirically, it has been observed that there is little difference between the 1×1, 2×2 and 3×3 alternatives. The most noticeable impacts on a rendered color image occur in those regions where the higher order terms are large enough to make a significant contribution to the block, for example, edges where there is a significant hue change and to a lesser extent edges where there is a chrominance change.

The adaptive alternative, also depicted at the bottom of FIG. 5, is designed to employ a variable-sized set of DCT coefficients in the first phase color correction operation. In particular, the coefficients are first analyzed to determine a block size 270 that may be based upon the relative values of the first nine (3×3) DCT terms or the relative location of the terms in color space (e.g., based upon DC color average). Depending upon the relative sizes of the low order terms or color space location, the number of terms to be employed may be modified.

The present invention is intended to reduce the number of processing steps and/or hardware necessary to provide color correction, particularly with respect to pre-compressed images. In order to demonstrate the advantages of such a system, relative to a "standard" tetrahedral-interpolation system, an analysis of the mathematical operations carried out for each of the alternatives was conducted. For a color correction operation combining phases I and II, the "standard" tetrahedral interpolation approach yielding four color separations requires (19 lookups+2.5 comparisons+14 additions+12 multiplications+2 shifts) times 64 pixels per 8×8 block of JPEG compressed data. The resultant number of operations is represented in the first row of Table 1. The respective number of operations is also depicted for each of the three determinable alternatives, listing the total number of operations for phase I and phase II processing and the percentage reduction in the total number of operations with respect to the "standard" method.

Table 1*

| "Standard" | Look-Ups 1216 | | Comparisons 160 | | Additions 896 | | Multiplications 768 | | Shifts 128 | |
| --- | --- | --- | --- | --- | --- | --- | --- | --- | --- | --- |
| 1 × 1 | 719 | 40.9 | 131 | 18.8 | 459 | 48.8 | 9 | 98.8 | 68 | 46.9 |
| 2 × 2 | 764 | 37.2 | 138 | 13.8 | 508 | 43.3 | 36 | 95.3 | 80 | 37.8 |
| 3 × 3 | 855 | 29.7 | 151 | 6.3 | 595 | 33.6 | 81 | 89.5 | 84 | 34.4 |

*For each operation, the (average case) number of operations per block for the first stage is shown in the left sub-column, and the number for the second stage is shown in the right sub-column. The standard method has only one stage.

Figure 6:
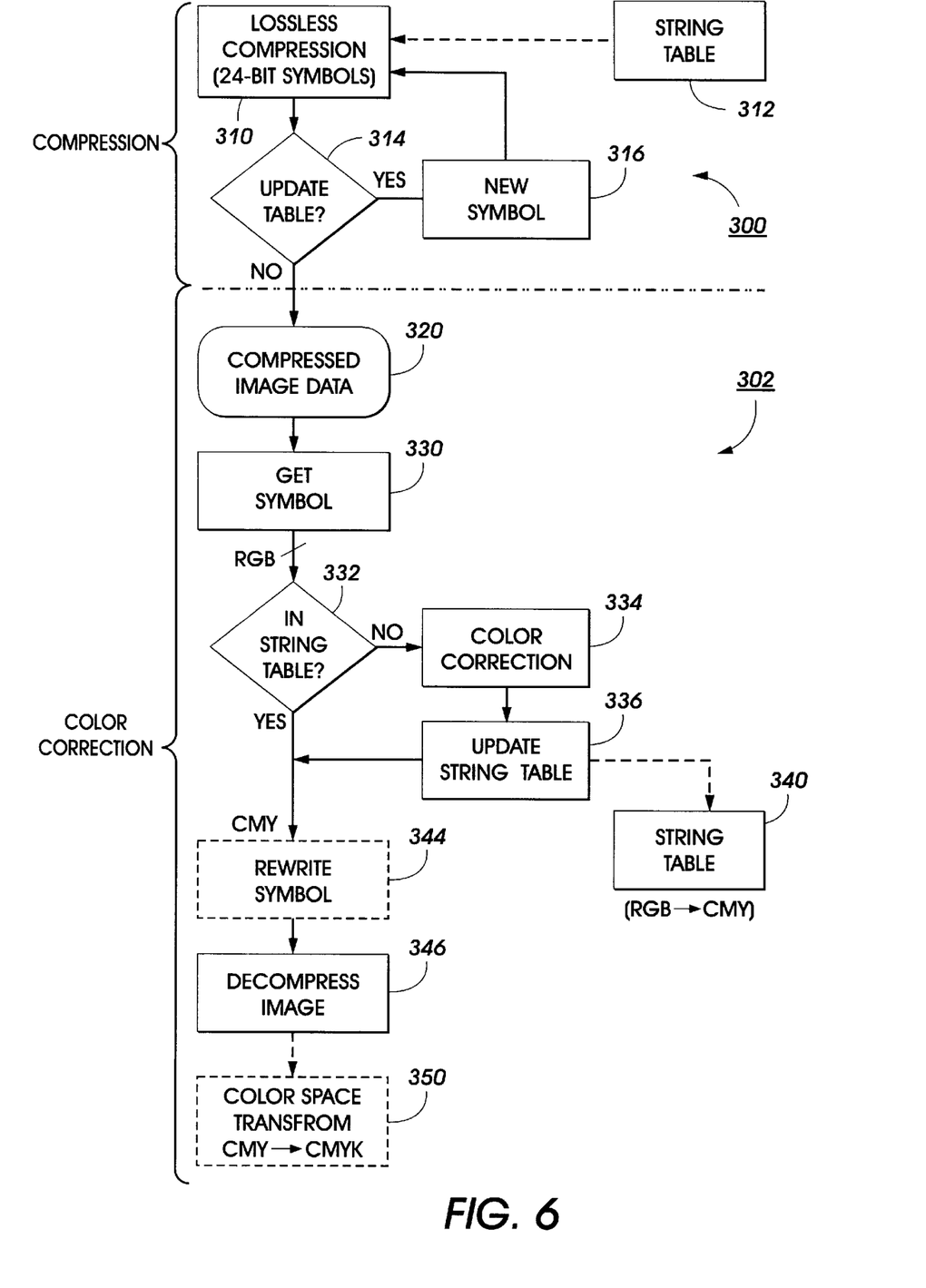
FIG. 6 is a flow chart depicting the processing steps of a lossless compression system in accordance with an alternative embodiment of the present invention.

The lossy compression embodiment of the present invention having now been described, reference is made to FIG. 6 where a flowchart depicting the steps of a lossless embodiment is found. Typical lossless compression schemes generate sequences of symbols and codes. By transmitting compact codes, indicating indirectly which previously seen symbol is to be used, lossless schemes achieve data compression. In particular, the LZW and other lossless compression algorithms would be modified to treat as symbols, pixels (defined by 24-bit values i.e., representing 3 color separations) rather than bytes. Some forms of lossless compression, e.g. pixel-based run-length encoding, already treat pixels as symbols, and would therefore not require any modification. By losslessly compressing using 24-bit symbols as depicted by step 310, the "symbols" can be color corrected (Phase I) once and then the corrected "value" can be employed for any subsequent occurrence of the same symbols. This approach would reduce the number of operations that need to be applied to accomplish color correction of losslessly compressed images, since the operations would be applied only to a portion of the data in the compressed file, which should contain less data than the uncompressed file.

As illustrated in FIG. 6, the lossless compression operation 310 employs 24-bit symbols. Strings of these symbols are stored in a string table 312. During compression of image data, the system maintains a current prefix, which is a string known to be in the string table, and which contains the last few symbols seen on the input. Each time a 24-bit pixel value is received, if the current prefix with that symbol added is still a string in the table, the current prefix is changed. Otherwise, the table is updated, and the encoding for the current prefix is sent, followed by the new symbol (step 314). It will be appreciated by those familiar with Lempel-Ziv compression schemes that the compression operations in region 300 of FIG. 6 are modified primarily to accommodate 24-bit symbols. Data compressed in this way may be stored, or transmitted on a low-bandwidth channel, but in the context of this invention it will be eventually displayed and/or printed.

Prior to display or printing, the compressed data may be further processed to accomplish color correction (either phase I transformation alone or phase I and II transformations concurrently) in an efficient manner as represented by the steps in region 302 of FIG. 6. In particular, the encoded representation of a 24-bit symbol is retrieved at step 330 and a determination is made at step 332 as to whether the symbol is found in string table 340. If not, the symbol is transformed using phase 1 color correction as described above to produce the color corrected value which is then stored in the string table. The corrected value is then substituted for the original value in the compressed file. In this way the corrected value will be employed by any subsequent decompression step to losslessly reproduce each subsequent occurrence of the encoded symbol.. Because a symbol need only be converted once, the number of color conversion operations is substantially reduced. It is reduced by a factor somewhat larger than the compression ratio, since only a fraction of the compressed file needs to be converted.

A lossless compressed file for which only a 3—3 conversion has been applied would generally require exactly the same amount of space to store after conversion as before— the symbols do not change size. Another alternative is to perform a 3-4 conversion (i.e. the complete color conversion) to the symbols in the compressed file, and generate a new file, which now takes more space than the original file due to the increased number of bits required to represent the larger (4-color) symbols. It will be appreciated, however, that the additional space is only required for the storage of the 4-color symbols, and not for the encoded representations thereof. Yet another alternative is to perform a complete conversion (3—3 or 3-4, depending on the device), and then complete the decompression operation using the updated table, rather than re-writing the compressed file.

Also depicted in FIG. 6 is an alternative operation, step 350, where the 3—3 color corrected images could be further processed to produce the fourth color (e.g., black) separation. While this alternative operation is not required if the transformation step of 342 is employed, it would be necessary if only a 3—3 transformation is accomplished and four color separations are required for rendering.

Other lossless compression schemes also separately describe the color values and where they are used so that the color values need not be expressed at every individual occurrence. In run-length encoding, for example, a color value is stored along with the number of successive pixels having that color value along a scan line. To perform color correction on the compressed image format one must apply color correction to only the color values while leaving the run lengths unchanged.

Huffman encoding makes use of the fact that some data values (e.g. some colors) are likely to occur far more often in an image than others. Huffman encoding uses a set of codes for the image values, where short codes are used for frequently occurring values and longer codes for the infrequently occurring values. A dictionary matching codes to values is constructed. This dictionary allows the original values to be recovered from the codes. When Huffman coding is applied directly to the image data (and not some already compressed form), the dictionary contains the mapping of code values to colors. To color correct the compressed form one need only apply the correction process to the color values in the dictionary In general, one need only conduct whatever partial decompression steps are required to reveal the color values for the compressed image. One need not complete the decompression by determining where within the image the color values belong. The color correction can then be applied to the revealed color values. The resulting partially decompressed image can then be either recompressed or fully decompressed as desired.

In recapitulation, the present invention is a method for color correcting digital images that have been at least partially compressed. In a preferred embodiment, aspects of the color correction are carried out on the compressed image data to improve computational efficiency. One of a number of alternative methods is employed to accomplish the color correction on lossy or losslessly compressed images. The two phase process accomplishes the first phase of color correction on compressed image data in conjunction with compression or decompression operations. A second phase of the color correction (color space transformation) is applied subsequently to the completely decompressed image data. Accordingly, the technique has application to any number of color imaging systems, including digital printers and copiers where there is a necessity to color correct compressed digital images.

It is, therefore, apparent that there has been provided, in accordance with the present invention, a method and apparatus for color correcting a compressed digital image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method for color correcting a compressed digital image in the form of a digital document comprising at least one compressed unit, said method comprising the steps of:

retrieving from memory a compressed unit of digital image data;

partially decompressing the retrieved compressed unit to produce a partially decompressed image representing the color of a region of the digital image in a first color space;

performing color correction on the partially decompressed unit, to produce a corrected unit in the first color space, by mapping at least a first color of the region in the first color space to a corresponding second color in the first color space using an interpolation process to complete the color correction transformation;

subsequently partially decompressing the corrected unit to produce decompressed, corrected image data having the form of a device dependent color space;

integrating said partially decompressed device dependent image data with the remaining compressed data before completely decompressing this result to form a fully decompressed data block; and performing a second phase color correction to convert said fully decompressed data block into device dependent signals.

2. The method of claim 1, further comprising the step of converting the decompressed, corrected image data into a second color space image for rendering.

3. The method of claim 1, wherein the compressed digital image is generated using a lossless compression method.

4. The method of claim 3 wherein the lossless compression method is selected from the group consisting of:

Huffman encoding;

Lempel-Ziv encoding; and run-length encoding.

5. The method of claim 1, wherein the compressed digital image is generated using a lossy compression method.

6. The method of claim 5 wherein the region comprises a plurality of pixels and where the lossy compression method uses discrete cosine transform.

7. The method of claim 6, wherein the step of partially decompressing the compressed unit produces a set of DCT coefficients and where the step of performing color correction comprises:

determining the DCT coefficients for each of a plurality of color separations;

inverse discrete cosine transforming the DCT coefficients to produce transformed coefficients including a DC term; and using at least the DC term of the transformed coefficients for each of a plurality of color separations, correcting at least one of the transformed coefficients.

8. The method of claim 7, wherein the transformed coefficients further include a plurality of AC terms and where the correcting step uses the DC term of the transformed coefficients and at least one low-order AC term of the transformed coefficients.

9. The method of claim 8, wherein the correcting step comprises a matrix transformation using the transformed coefficients as an input.

10. The method of claim 8, wherein the number of transformed coefficients is determined as a function of the value of the DC term of the DCT coefficient for each of the color separations.

11. The method of claim 8, wherein the number of AC terms of the transformed coefficients is determined as a function of the values of a plurality of low order AC terms of the DCT coefficients for each of the color separations.

12. The method of claim 1 wherein the steps of partially decompressing the compressed unit and performing color correction on the partially decompressed unit are carried out upon only a subset of the compressed data representing the region of the image, the method further comprising the steps of:

merging the subset of color space transformed data with the partially decompressed unit;

recompressing the partially decompressed unit to generate a second compressed unit; and temporarily storing the second compressed unit in a memory.

13. The method of claim 1 wherein the region comprises a plurality of pixels.

* * * * *